(12) United States Patent
Eichenblatt

(10) Patent No.: US 8,548,829 B1
(45) Date of Patent: Oct. 1, 2013

(54) SYSTEM AND METHOD FOR LOAN GUARANTEE INSURANCE

(76) Inventor: David Eichenblatt, Atlanta, GA (US)

(*) Notice: Subject to any disclaimer, the term of this patent is extended or adjusted under 35 U.S.C. 154(b) by 1004 days.

(21) Appl. No.: 12/372,098

(22) Filed: Feb. 17, 2009

Related U.S. Application Data

(60) Provisional application No. 61/030,828, filed on Feb. 22, 2008.

(51) Int. Cl.
*G06Q 40/00* (2012.01)

(52) U.S. Cl.
USPC .................................................... 705/4

(58) Field of Classification Search
USPC .............................................. 705/4, 35, 37
See application file for complete search history.

(56) References Cited

U.S. PATENT DOCUMENTS

| | | | |
|---|---|---|---|
| 5,742,775 A | 4/1998 | King | |
| 6,154,730 A | 11/2000 | Adams et al. | |
| 6,253,191 B1 | 6/2001 | Hoffman | |
| 6,330,547 B1 | 12/2001 | Martin | |
| 6,460,021 B1 | 10/2002 | Kirksey | |
| 6,654,727 B2 | 11/2003 | Tilton | |
| 7,028,007 B1 | 4/2006 | Abrahams et al. | |
| 7,099,843 B1 | 8/2006 | Cassidy et al. | |
| 7,725,386 B2 * | 5/2010 | Prieston | 705/38 |
| 7,996,304 B1 * | 8/2011 | Thomas et al. | 705/38 |
| 8,065,208 B1 * | 11/2011 | Abrahams et al. | 705/35 |
| 8,103,565 B2 * | 1/2012 | Buerger et al. | 705/35 |
| 8,355,932 B2 * | 1/2013 | Malackowski et al. | 705/4 |
| 2001/0037274 A1 * | 11/2001 | Monticciolo | 705/35 |
| 2001/0047326 A1 * | 11/2001 | Broadbent et al. | 705/38 |
| 2002/0103750 A1 * | 8/2002 | Herzfeld | 705/38 |
| 2002/0116327 A1 | 8/2002 | Srinivasan | |
| 2002/0138410 A1 | 9/2002 | Siska | |
| 2002/0138415 A1 | 9/2002 | Siska | |
| 2003/0236676 A1 | 12/2003 | Graham | |
| 2004/0019557 A1 | 1/2004 | Yaruss et al. | |

(Continued)

FOREIGN PATENT DOCUMENTS

| | | | |
|---|---|---|---|
| KR | 10-2007-0042605 | * | 4/2007 |
| KR | 1020070042605 | * | 4/2007 |

OTHER PUBLICATIONS

Justice USLaw: 25 C.F.R Part 103—Loan, Guarantee, Insurance and Interest Subsidy, Source: 66 FR 3867, Jan. 17, 2001, Code of Federal Regulations, Title 25 -Indian, Chapter I, Bureau of Indian Affairs (BEA), Department of the Interior, pp. 1-23.*

(Continued)

*Primary Examiner* — Bijendra K Shrestha
(74) *Attorney, Agent, or Firm* — Chinh H. Pham; Jonathan Z. Lin; Greenberg Traurig, LLP

(57) ABSTRACT

Loan guarantee or surety insurance processes and systems for use in a commercial loan arrangement between a borrower and a lender, in which the borrower is typically required to provide to the lender a personal guarantee of some or all of the amount of the commercial loan to obtain the loan, wherein loan guarantee insurance of an insured amount is calculated and provided, in exchange for payment of premiums, by a loan guarantee insurance provider or similar third party in order to replace some or all of the personal guarantee amount required of the borrower. The terms of the loan guarantee insurance is calculated and based on information about the commercial loan, the underlying project, the borrower, and other underwriting criteria.

19 Claims, 6 Drawing Sheets

100
System for providing a loan

(56) References Cited

U.S. PATENT DOCUMENTS

| | | |
|---|---|---|
| 2004/0153388 A1 | 8/2004 | Fisher et al. |
| 2004/0220866 A1 | 11/2004 | Marlowe-Noren |
| 2004/0220872 A1* | 11/2004 | Pollock, III ................. 705/38 |
| 2004/0243450 A1* | 12/2004 | Bernard et al. ............... 705/4 |
| 2004/0243509 A1* | 12/2004 | Schulkins ..................... 705/38 |
| 2005/0010487 A1 | 1/2005 | Weisbach et al. |
| 2005/0144119 A1 | 6/2005 | Monsen et al. |
| 2005/0203832 A1 | 9/2005 | Prieston |
| 2005/0262000 A1 | 11/2005 | Sato |
| 2006/0085324 A1 | 4/2006 | Laubacher |
| 2006/0184450 A1 | 8/2006 | Ely et al. |
| 2007/0094127 A1 | 4/2007 | Izyayev |
| 2007/0106585 A1 | 5/2007 | Miller |
| 2007/0226098 A1 | 9/2007 | Williams |
| 2007/0260535 A1* | 11/2007 | Kontogiannis ................. 705/38 |
| 2008/0052224 A1* | 2/2008 | Parker ........................... 705/38 |

OTHER PUBLICATIONS

Prescott et al.: What's Up Front: A Guide to Fronting Arrangements, Mar. 1, 2002, Johnson Lambert & Co., pp. 1-2.*

PRWeb: Erissa Personal Guarantee Insurance, Aug. 10, 2005, p. 1.*

Comptroller of the Currency Administrator of National Banks: Commercial Real Estate and Construction Lending, Comptroller's Handbook, Nov. 1995-1998, pp. 1-98.*

McDonald, Jay: With personal guarantee loans, you bet all, Jan. 22, 2001, pp. 1-2.*

\* cited by examiner

SYSTEM AND METHOD FOR LOAN GUARANTEE INSURANCE

CROSS-REFERENCE TO RELATED PATENT APPLICATION

This application claims the benefit, pursuant to 35 U.S.C. §119(e), of provisional U.S. application Ser. No. 61/030,828, filed Feb. 22, 2008, entitled "Fronting Approach for Loan Guarantee Insurance Company" by David Eichenblatt, the disclosure for which is hereby incorporated herein in its entirety by reference.

FIELD OF THE INVENTION

The present invention relates generally to loans and insurance, and in particular to a loan guarantee insurance product, process and system.

BACKGROUND OF THE INVENTION

In the real estate market, in order to decrease its risk of loan default, a bank or other short-term lender often requires a substantial equity investment before it will issue a loan to a borrower. In addition, lenders still require a personal guarantee from the borrower in lieu of the equity investment or in addition to the equity investment. The combination of these two requirements has created a disconnect between the need for high quality credit and the market for loans.

An opportunity therefore exists for loan guarantee insurance, such as a guarantee, surety, or other type of insurance product for transferring or supporting any portion of a loan's risk or obligation and that would, for example, replace some or all of the equity investment and personal guarantee required from developers, redevelopers, investors, or any borrower needing typical bank or any lender financing.

An opportunity also exists to use a fronting agreement to provide loan guarantee insurance. Fronting is an approach for an insurance company, who underwrites an insurance policy to have national reach and licensing immediately in all states, by using a highly rated company to issue and stand behind the policy. Under a typical fronting agreement, a fronting insurance provider assumes little or no loss exposure; instead, financial arrangements are made to guarantee claims administration and payments. The fronting insurance provider issues the insurance policy, makes the filings required by state laws, pays premium tax and assessment fees, and cedes the entire risk to the captive, for example an underwriting insurance provider. The fronting insurance provider can be paid a percentage of the premium received by the re-insurer, the amount of which depends on the extent of their services.

Therefore, a heretofore unaddressed need still exists in the art to address the aforementioned deficiencies and inadequacies.

SUMMARY OF THE INVENTION

These and other aspects of the present invention will become apparent from the following description of the preferred embodiments, taken in conjunction with the following drawings, although variations and modifications therein may be affected without departing from the spirit and scope of the novel concepts of the disclosure.

Loan guarantee insurance, such as a loan guarantee, insurance policy, surety, or other type of insurance product for transferring or supporting any portion of a loan's risk or obligation, is created to replace some or all of the equity investment or personal guarantee typically required of developers, redevelopers, investors, or any other borrower needing typical lender financing. The loan guarantee or insurance allows the borrower to be removed from the personal guarantee by furnishing the bank with a substitute guarantee from a high-quality credit source. A fee is charged to the borrower or bank for this service. The fees are front-end, front-end plus back-end, and/or equity participation in the project. The loan amount guaranteed by the insurance or surety product typically will be a portion (e.g. 25% to 50%), of the loan amount, but not for the entire loan amount. Currently, most banks will remove the personal guarantee requirement if approximately half (50%) equity is provided by the borrower. A combination of borrower equity in addition to loan guarantee insurance would satisfy this requirement. In one alternative, the loan guarantee insurance may be used in combination with some equity and some personal guarantee—in which case, the loan guarantee insurance reduces but does not totally eliminate the equity and personal guarantee amounts and requirement. Alternatively, the lender may require a surety arrangement as a supplement to the personal guarantee, wherein the borrower or a representative of the borrower is responsible for more of the risk.

A capped loan guarantee insurance can replace the personal or corporate guarantee required by banks for real estate construction, redevelopment or permanent loans. The loan guarantee is capped, in some instances, because it only covers a portion of the bank loan. In this way, any loss beyond the cap will be borne by the bank. The loan guarantee insurance is available for the primary types of commercial real estate, including office, industry, residential (e.g. apartments) and commercial (e.g. retail) or non-primary types such as hotels, or marinas.

In one embodiment, in a commercial loan arrangement between a borrower and a lender in which the lender is providing a loan of a certain amount to the borrower and the borrower is required to provide a personal guarantee of a portion of the certain amount of the loan in order to obtain the loan from the lender, wherein the loan is associated with a project and wherein a loan processing computer of the lender is in electronic communication with a loan guarantee insurance system of an insurance provider, wherein the loan guarantee insurance system includes a computer processor and computer-readable instructions stored in a computer-readable medium that, when executed, cause the computer processor to perform the steps comprising receiving information electronically from the loan processing computer of the lender wherein the information includes: (i) a request for loan guarantee insurance associated with the loan, (ii) the certain amount of the loan; (iii) the amount of the personal guarantee required by the lender, (iv) details about the project; and (v) details about the borrower; calculating an insured amount for the loan guarantee insurance based on how much of the personal guarantee amount will be replaced by the loan guarantee insurance; calculating terms for the loan guarantee insurance based on predetermined underwriting criteria and the received information; generating the loan guarantee insurance for the insured amount and having the calculated terms included therein, wherein the loan guarantee insurance is backed by the insurance provider; and providing the loan guarantee insurance for the project so that the loan can be provided by the lender to the borrower for the certain amount and so that the personal guarantee amount required of the borrower can be reduced or eliminated.

The present invention, in another aspect, relates to a method to be used in a commercial loan arrangement between a borrower and a lender, in which the lender is providing a loan to the borrower and the borrower is required to provide a personal guarantee of a portion of the amount of the loan. In one embodiment, the method has the steps of receiving a request for loan guarantee insurance, receiving information on the loan amount and the personal guarantee amount, and receiving risk information about the borrower. The method further has the steps of determining an insured amount, based on how much of the personal guarantee amount will be replaced by the loan guarantee insurance, and then determining, based on predetermined underwriting criteria and the received information, a premium required in order to issue the loan guarantee insurance to the borrower. The method also has the step of issuing the loan guarantee insurance for the insured amount for the borrower to the borrower or lender upon receipt of the premium. In one embodiment, the loan is a commercial real estate loan and the underwriting criteria includes one or more of past experience of the borrower, financial statements of the borrower, and personal equity of the borrower. The amount insured by the loan guarantee insurance provides some of the personal guarantee amount that, when combined with a supplemental equity amount provided by the borrower, is sufficient to satisfy the personal guarantee required by the lender. Here, the personal guarantee includes borrower equity and the insured amount.

In another aspect, the present invention relates to a method of providing a loan, in a commercial loan arrangement between a borrower and a lender, where the lender is providing a loan to the borrower and the borrower is required to provide a personal guarantee of a portion of the amount of the loan. In one embodiment, the method has the steps of receiving a request for the loan from the borrower, receiving information about the borrower, and receiving information about a loan guarantee insurance provider that is capable of providing loan guarantee insurance for an insured amount to replace some or all of the personal guarantee. The method further has the steps of determining, based on the received information and the loan request, a loan amount to lend to the borrower and determining the personal guarantee amount, where the personal guarantee amount includes borrower equity and the insured amount. In further steps of the method, the lender demands a personal guarantee of a portion of the loan amount from the borrower, in order to release the loan to the borrower. The borrower then provides the personal guarantee amount to the lender, at which point the lender releases the loan to the borrower. In the last step, the borrower completes the commercial project using the loan amount received from the lender.

In one embodiment, the information about the borrower and loan guarantee insurance provider includes one or more of credit rating information and personal equity information, and the loan is a commercial real estate loan. Moreover, the steps of determining a loan amount to lend to the borrower and determining the personal guarantee amount further include the step of determining a percentage of borrower equity in relation to the insured amount. The step of determining a loan amount to lend to the borrower and the personal guarantee amount also has the step of determining a minimum amount of borrower equity. Also, the personal guarantee amount required for the loan varies based on the amount of borrower equity.

There are several different outcomes that can occur when the borrower has completed a project using the loan from the lender. In one possible outcome, the value of the project exceeds the loan amount, such that the borrower is able to repay the loan and thereby own project. In this case, the loan guarantee insurance expires, since the borrower did not default on the loan. In a second possible outcome, the value of the project is less than the loan amount, but the value exceeds a capped amount, where the loan guarantee insurance is capped because it covers only a portion of the bank loan, not the entire amount. Accordingly, any loss that exceeds the cap amount is borne by the lender. When the borrower defaults, this triggers the loan guarantee insurance policy, where the loan guarantee insurance provider pays out an amount equal to the difference between the loan balance amount and the project value at completion, or the net proceeds realized by the lender, such as after a foreclosure sale proceeding. The lender is therefore made whole. In a third possible outcome at project completion, the value of the project is less than the loan amount and it is also less than the cap amount. Here, the borrower defaults and the loan guarantee insurance is triggered. The loan guarantee insurance provider then pays out the capped amount to the lender. This means that the lender suffers a loss equal to the difference between the project value at completion and the capped amount.

In another aspect, the present invention relates to a system for providing a loan. In one embodiment, the system includes a borrower, a lender, and a loan guarantee insurance provider. Under a commercial loan arrangement between the borrower and the lender, the borrower is required to provide to the lender a personal guarantee of a portion of the amount of the loan. The loan guarantee insurance provider then provides loan guarantee insurance of an insured amount that replaces some or all of the personal guarantee amount, in exchange for a premium from the borrower or the lender and the lender provides the loan to the borrower upon receipt of the personal guarantee.

In one embodiment, the loan is a commercial real estate loan. The loan guarantee insurance replaces some of the personal guarantee amount and the remainder of the personal guarantee amount is borrower equity. In this embodiment, the loan insurance provider includes an underwriting insurance provider for underwriting the borrower for the loan guarantee insurance, as well as a fronting insurance provider for issuing the loan guarantee insurance. The fronting insurance provider issues the loan guarantee insurance in exchange for a promise to repay and a fee from the underwriting insurance provider, and the fronting insurance provider has a higher credit rating than the underwriting insurance provider. The fronting insurance provider receives the premium from the borrower and the underwriting insurance provider receives the difference between the premium and the fee to the fronting insurance provider. In the event of default on the loan, the loan guarantee insurance provider pays out the insured amount.

In one embodiment, the promise to repay includes one or more of personal equity and a letter of credit. In the event of default on the loan, the fronting insurance provider pays out the insured amount to the lender and the underwriting insurance provider reimburses the fronting Insurance provider. The insured amount replaces some of the personal guarantee amount, that, when combined with a supplemental amount provided by the borrower, is sufficient to satisfy the personal guarantee amount. The supplemental amount may include personal equity of the borrower.

In another embodiment, the insured amount replaces some or all of the person guarantee amount that, when combined with a supplemental equity amount provided by the borrower, is sufficient to confer an investment grade rating for some or all of the loan.

These and other aspects of the present invention will become apparent from the following description of preferred embodiments taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1A:
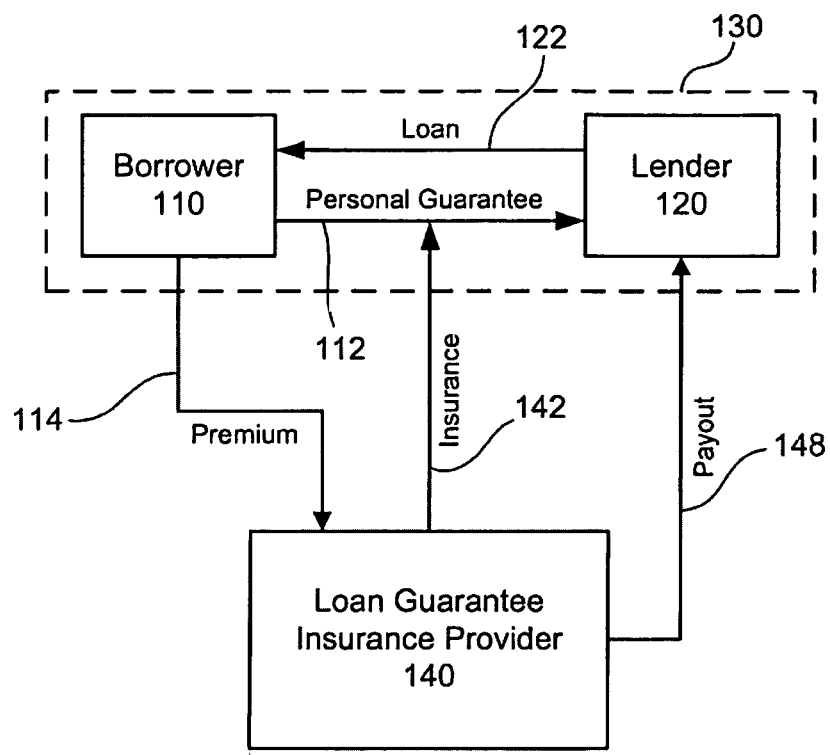
FIGS. 1A and 1B show schematically a system for providing a loan, according to one embodiment of the present invention, where FIG. 1A illustrate the system generically and FIG. 1B illustrate a computer-implemented arrangement of the system.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

In addition, some references, if any, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

The description will be made as to the embodiments of the present invention in conjunction with the accompanying drawings in FIGS. 1-5.

Now referring to the system for providing a loan as schematically shown in FIG. 1A, in one aspect, the present invention relates to a method to be used in a commercial loan arrangement 130 between a borrower 110 and a lender 120, in which the lender 120 is providing a loan 122 to the borrower 110 and the borrower 110 is required to provide a personal guarantee 112 of a portion of the amount of the loan 122. In one embodiment, the method has the steps of receiving a request for loan guarantee insurance 142, receiving information on the amount of the loan and the amount of the personal guarantee 112 and receiving risk information about the borrower 110. The method further has the steps of determining an amount to be insured, based on how much of the personal guarantee amount will be replaced by the loan guarantee insurance 142, and determining, based on predetermined underwriting criteria and the received information, the amount of a premium 114 required in order to issue the loan guarantee insurance 142 to the borrower 110 or lender 120. The method also has the step of issuing the loan guarantee insurance 142 for the insured amount, for the borrower 110 to the borrower 110 or lender 120, upon receipt of the premium 114. Alternatively, the premium 114 may be paid by the lender 120 and the loan guarantee insurance can be issued to the lender 120.

In another aspect, the present invention relates to a method of providing a loan. In one embodiment, the loan 122 is a real estate construction loan and the underwriting criteria includes one or more of past experience of the borrower 110 financial statements of the borrower 110, and personal equity of the borrower 110. The amount insured by the loan guarantee insurance 142 provides some or all of the personal guarantee amount that, when combined with a supplemental equity amount provided by the borrower 110, is sufficient to satisfy the amount of the personal guarantee required by the lender 120. The personal guarantee 112 thus includes borrower equity and the insured amount.

Figure 1B:
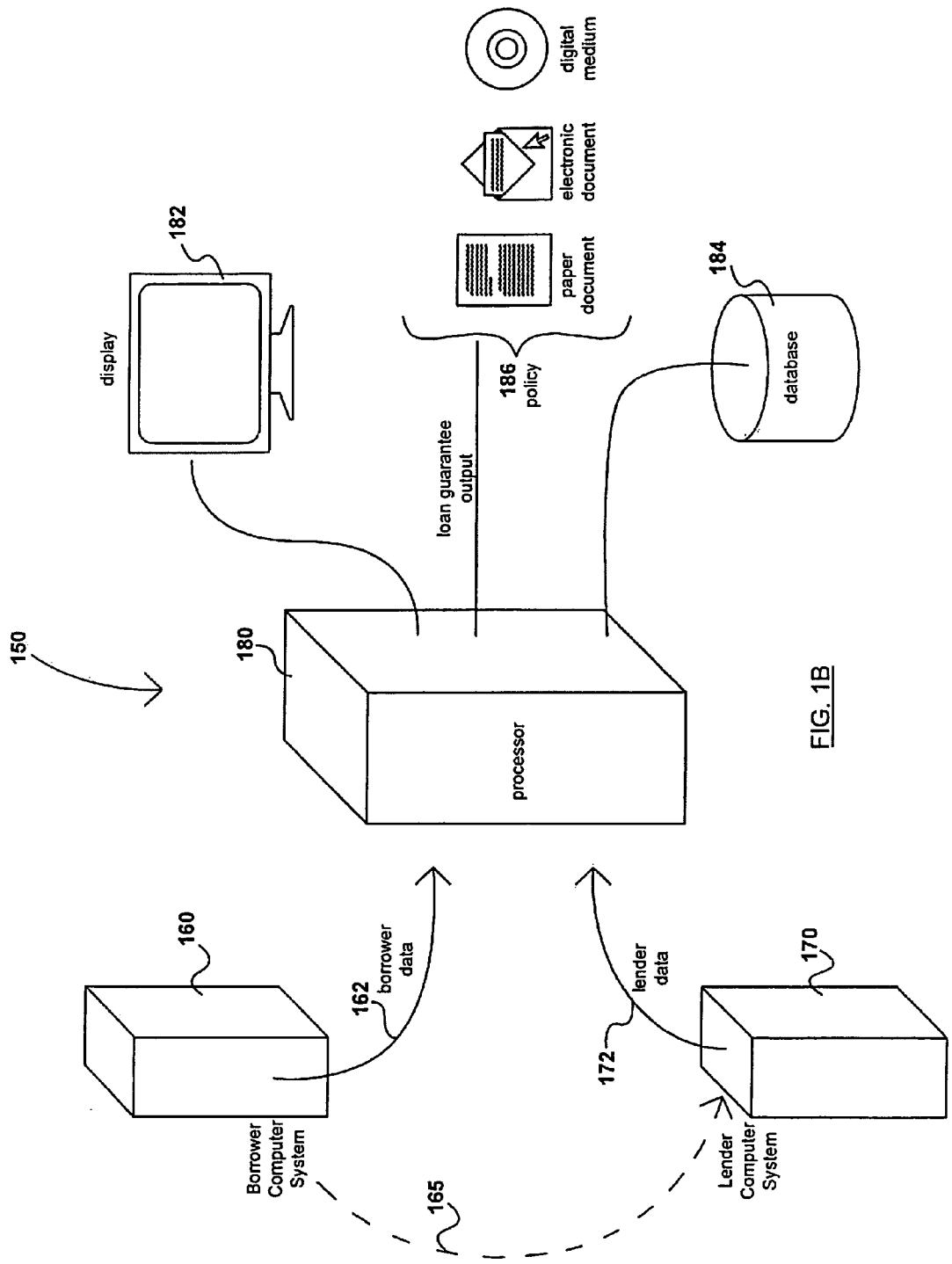

FIG. 1B illustrates a computer-implemented loan guarantee system 150 corresponding to the generic system 100 described in FIG. 1A. The system 150 is conveniently implemented using conventional general purpose computers or microprocessors programmed according to the teachings described herein. The conventional general purpose computers, servers, and microprocessors are known to those of skill in the art and include processors, memory, user-interfaces, components, modules, communication and other hardware, such as described in U.S. Pat. No. 7,415,426, among many others, all of which are hereby incorporated by reference in their entirety. Appropriate software programming that is executable by such general purpose computers and processors can be readily prepared by programmers of ordinary skill in the software arts, based on the teachings described herein and to implement the methods and processes described herein.

As shown in FIG. 1B, the computer-implemented loan guarantee system includes a borrower computer system 160, a lender computer system 170, and a loan guarantee insurance provider computer system 180, which are in electronic and data communication. The loan guarantee insurance provider computer system 180 includes and is in communication with at least one database 184, a display 182, and other conventional components and user interface hardware (hot shown). The loan guarantee insurance provider computer system 180 receives data 162, 172 from one or both of the borrower system 160 and lender system 170 necessary to analyze and generate a loan guarantee product associated with a loan being created between the borrower and lender. In an alternative embodiment (not shown), the lender system 170 is the only computer system in electronic communication with the processor 180 and provides all necessary data associated with the borrower and lender needed by the processor 180. In such a scenario, any necessary data 165 is provided by the borrower system 160 to the lender system 170. Data necessary to analyze and generate a loan guarantee product associated with a loan being created between the borrower and lender includes a request for loan guarantee insurance, information about the loan, information about the borrower, the amount or level of the personal guarantee required by the lender or based on industry, legal, or contractual requirements, and pre-determined underwriting criteria. It will be appreciated by those skilled in the art that some of this data and information may be standardized or conventional and not specific to a particular loan or relationship between the borrower and lender. In such situations, data or information may be maintained by the database 184 associated with or accessed by the loan guarantee insurance provider system 180 rather than provided by the borrower or lender computer systems 160, 170. Once all necessary data has been received by the loan guarantee insurance provider system 180, the system 180 analyzes and processes such data to generate a suitable loan guarantee product output 186 for use and access by the borrower and lender. Such output from the loan guarantee insurance provider system 180 may be reduced to a printed document (insurance policy or guarantee), an electronic policy that can be transmitted or provided electronically, or stored in a computer-readable or digital medium (disk, file, etc.). The loan guarantee product output 186 of the system 180 may either be a determination or datafile of the policies and terms that should be used to create and generate a loan guarantee insurance policy or it can be an actual policy issued by the loan guarantee insurance provider.

The database 184 stores data and information received from the borrower and/or lender systems 160, 170 and other data and information relevant to underlying loans, guarantees and policies issued on such loans, and any other information, such as underwriting criteria, that is used by the system 180 for calculating and generating loan guarantee product outputs 186.

As will be appreciated by those skilled in the art, underwriting criteria or underwriting requirements typically include the following types of documents or information: a) Project Feasibility Outline; b) Borrower Information; c) Appraisal & Market Studies; d) Loan Terms (Basic); e) Loan Structure (including any mitigations of construction risk); and f) Take-Out Risk. Project Feasibility typically includes at least one of: i) outline of project configuration, amenities, and unit build out; ii) Status of zoning, use or occupancy restriction; iii) Time Line of Project Events—closing, construction, pre-leasing, etc.; iv) Budget—review of all assumptions, including pre-leasing, etc.; v) Survey; vi) Soil Reports; vii) Review any credit enhancements features; viii) General Contractor Qualifications; ix) Construction Contract; x) Plans and Specifications; xi) Inspector(s); xii) Zoning Letter; xiii) Utility Certificate; and xiv) Insurance Company—Named Additionally Insured. Borrower Information typically includes at least one of: i) Resume and past experience with construction projects; ii) Borrower/sponsor financial statements; iii) Equity/Investor Information. Appraisal & Market Studies typically includes at least one of: i) Appraisal Value (land, as-complete and stabilized); ii) Review of comparable projects—within submarket; iii) Loan to cost ratio; iv) Loan to Value (Appraised); v) Borrower Equity and vi) Environmental Studies (Phase I and II needed). Loan Terms (Basic) typically includes at least one of: i) Total Amount; ii) Amount advanced to date; iii) Capital Stock; iv) Insurance Coverage during construction and thereafter (Names/Rating of provider); v) Recourse to borrower—"bad boy" and completion only; vi) Type of financing (pure construction, mini-perm, take-out); vii) Carry Risk—interest and other insurance; and viii) Interest Rate Risk—mitigation (interest rate swaps, hedges, caps). Loan Structure (including any mitigations of construction risk) typically includes at least one of: i) Payment and/or Performance Bond; ii) Completion Bond; iii) Fixed Price Construction Contract; iv) Architect; v) Construction Manager; vi) Debt Guarantee; vii) Completion Guarantee; viii) Retainage Factor; ix) Funding Mechanics—Inspection/lien waiver/architect's certificate/advancing mechanism; x) Detailed sources and uses of proceeds (monthly and quarterly); xi) Delay cost reserve—if pre-lease tenants have a penalty in their lease; and xiii) Overage factors built into budget—Contingency (5%-10%). Take-Out Risk typically includes at least one of: i) Take-out lender and senior unsecured lender (if applicable); ii) Pre-sales (if applicable); iii) Presales (as % of total); iv) Presales History; v) Down payment required on presales (as a % of sales price); vi) Release prices/mechanics; vii) Pre-leasing activity; viii) Pro-forma activity; ix) Pro-Forma financials for as-built property; and x) Credit tenant/build-to-suit.

Figure 2:
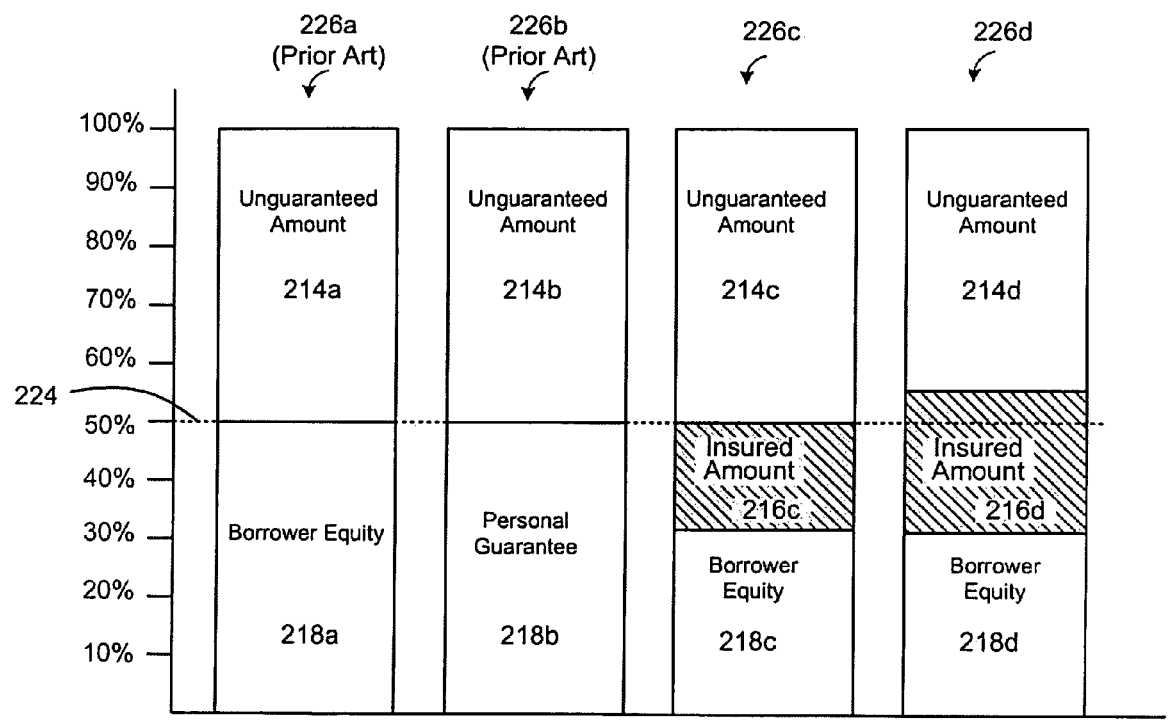
FIG. 2 shows a diagram of the structure of a personal guarantee amount in relation to the entire loan amount according to another embodiment of the present invention.

Now referring to the diagram of FIG. 2, in one embodiment of the present invention, an entire capitalization stack 226 is shown, which includes a portion that is unguaranteed 214 and a portion comprised of part borrower equity 218 and part loan guarantee insurance 216. The lender accepts the risk of taking on the unguaranteed amount 214, but the lender also requires that a portion of the entire capitalization stack 226 be covered by a personal guarantee 224 from the borrower. Previously, a lender would require that borrower equity 218*a* make up 50% of the entire capitalization stack 226*a* to satisfy the lender in order for the loan to be made to the borrower. Alternatively, a lender conventionally may require that 50% of the entire capitalization stack 226*b* be covered by a personal guarantee 218*b*. Alternatively and not shown, the lender conventionally requires 50% (or more) of the entire capitalization stack to be covered by a combination of borrower equity and personal guarantee. According to the embodiment of the present invention shown in FIGS. 2 at 226*c* and 226*d*, a portion of the required personal guarantee 224 can be provided by borrower equity 218*c*, 218*d* and a portion can be provided by an insured amount 216*c*, 216*d* covered by loan guarantee insurance to release the personal guarantee 224 requirement. In this exemplary embodiment, the required personal guarantee amount 224 is 50% of the entire capitalization stack 226. However, the lender may require more or less than this amount. Also, the amount of a total personal guarantee amount 216, 218 provided by the borrower can exceed the personal guarantee amount 224, and the portion that each of the amount insured by loan guarantee insurance 216 and the portion covered by borrower equity 218 can be comprised of more or less of one component and a corresponding complimentary amount of the other. Alternatively, the lender may require a surety arrangement, compared to a guarantee arrangement, as a supplement to the personal guarantee, wherein the borrower or a representative of the borrower bears more of the risk.

Figure 3:
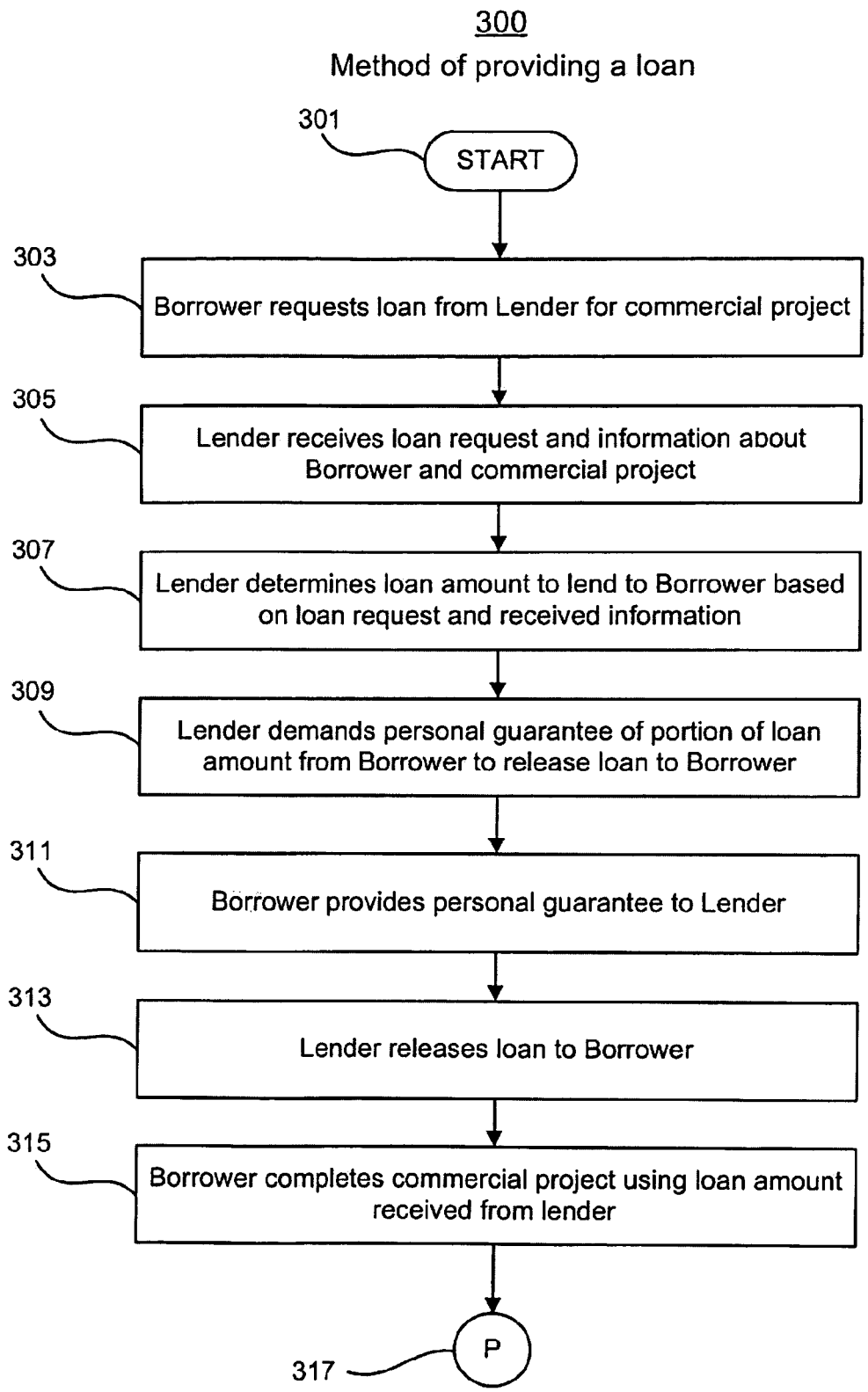
FIG. 3 shows a flow chart of a method of providing a loan, according to yet another embodiment of the present invention.

Now referring to the flow chart of FIG. 3, in another aspect, the present invention relates to a method 300 of providing a loan, in a commercial loan arrangement between a borrower and a lender, where the lender is providing a loan to the borrower and the borrower is required to provide a personal guarantee of a portion of the amount of the loan. In one embodiment, the method starts at 301 and has the steps of receiving a request for the loan from the borrower, at step 303, receiving information about the borrower, and receiving information about a loan guarantee insurance provider that is capable of providing loan guarantee insurance for an insured amount, to replace some or all of the personal guarantee, at step 305. The method further has the steps of determining, based on the received information and the loan request, a loan amount to lend to the borrower and determining the personal guarantee amount, wherein the personal guarantee amount includes borrower equity and the insured amount, at step 307. At step 309, the lender demands a personal guarantee of a portion of the loan amount from the borrower, in order to release the loan to the borrower. At step 311, the borrower provides the personal guarantee amount to the lender, at which point the lender releases the loan to the borrower, at step 313. The borrower then completes a project using the loan amount received from the lender, at step 315, and the method proceeds to step 317 (point P), which is described in further detail thereafter in connection with the flow chart of FIG. 4.

In one embodiment, the information about the borrower and loan guarantee insurance provider includes one or more of credit rating information and personal equity information, and the loan is a commercial real estate construction or redevelopment loan. The loan can alternatively be a permanent loan. Moreover, the steps of determining a loan amount to lend to the borrower and determining the personal guarantee amount, at step 307, further include the step of determining a percentage of borrower equity in relation to the insured amount. In another embodiment, the step 307 of determining a loan amount to lend to the borrower and the personal guarantee amount also includes the step of determining a minimum amount of borrower equity. The personal guarantee amount required for the loan can vary based on the amount of borrower equity.

Figure 4:
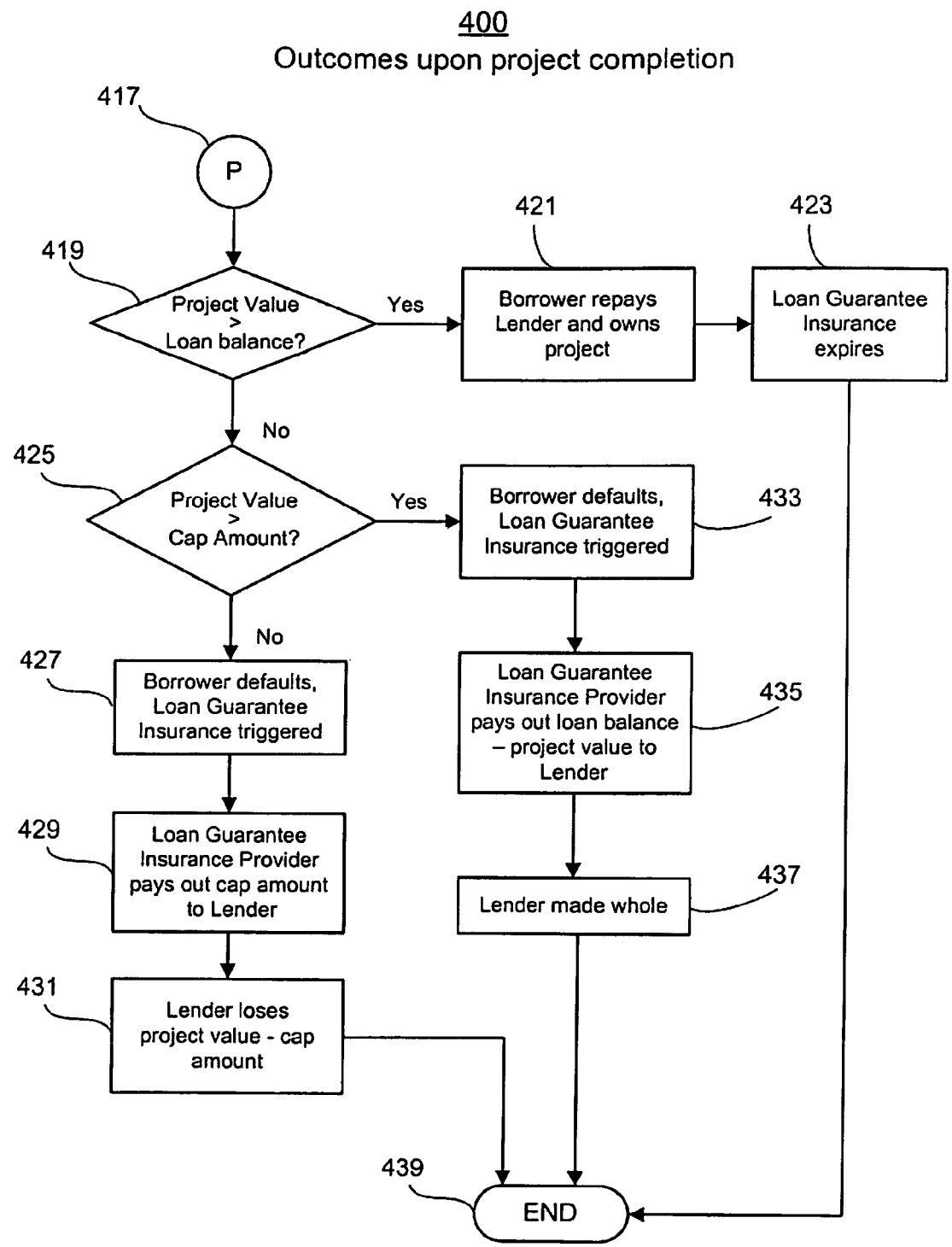
FIG. 4 shows a flow chart in connection with the method shown in FIG. 3.

Now referring to the flow chart of FIG. 4, there are several different outcomes that can occur when the borrower has completed the project, such as a commercial rest estate project, using the loan from the lender. From step 417 (Point P, which corresponds to the last step 317 in FIG. 3) it is determined whether the value of the completed project exceeds the loan balance amount, at step 419. In one possible outcome, the value of the project does exceed the loan balance amount, i.e. flow moves across along the "Yes" arrow to step 421, where the borrower repays the loan and owns the project. In this case, the loan guarantee insurance expires, at step 423, since the borrower did not default on the loan, and flow stops at point 439 ("End"). In a second possible outcome, as shown at step 425, the value of the project is less than the loan amount and therefore flow moves down along the "No" arrow from step 419 to step 425, but, the value exceeds a capped amount. As discussed above, the loan guarantee insurance is capped because it covers only a portion of the loan, not the entire amount. Accordingly, any loss that exceeds the cap amount is borne by the lender. As shown, this outcome corresponds to the "Yes" arrow from step 425 to step 433. At step 433, the borrower defaults, which triggers the loan guarantee insurance. At step 435, the loan guarantee insurance provider pays out an amount equal to the difference between the loan balance amount and the project value at completion, to the lender. The lender is therefore made whole, at step 437, and flow stops at point 439 ("End"). In a third possible outcome at project completion, the project value is less than the loan balance amount, corresponding to the "No" arrow from 419 to 425; and the project value is also less than the cap amount, corresponding to the "No" arrow from step 425 to step 427. At step 427, the borrower defaults and the loan guarantee insurance is triggered. The loan guarantee insurance provider then pays out the capped amount to the lender, at step 429. This means that the lender suffers a loss equal to the difference between the project value at completion and the capped amount, at step 431, and the flow ends at 439 ("End").

Figure 5:
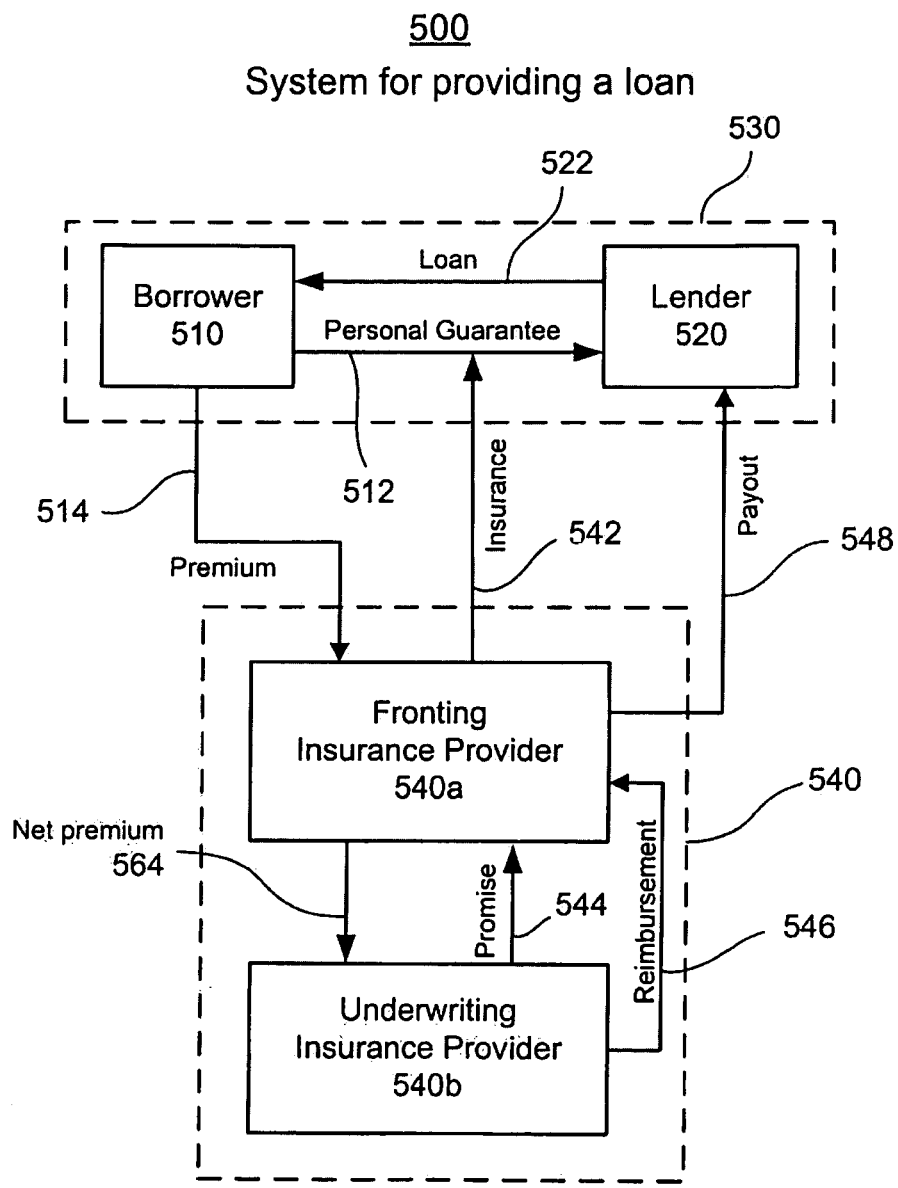
FIG. 5 shows schematically a system for providing a loan, according to yet another embodiment of the present invention.

Now referring to the system schematically shown in FIG. 5, in another aspect, the present invention relates to a system for providing a loan. In one embodiment, the system includes a borrower 510, a lender 520, and a loan guarantee insurance provider 540. Under a commercial loan arrangement 530 between the borrower 510 and the lender 520, the borrower 510 is required to provide to the lender 520 a personal guarantee 512 of some or all of the amount of the loan 522. The loan guarantee insurance provider 540 provides loan guarantee insurance 542 of an insured amount that replaces some or all of the personal guarantee amount, in exchange for a premium 514 from the borrower 510 or the lender 520, and the lender 520 provides a loan 522 to the borrower 510 upon receipt of the personal guarantee 512. Alternatively, the premium can be provided by the lender 520. The loan guarantee insurance 542 replaces some of the personal guarantee amount 224 and the remainder of the personal guarantee amount is borrower equity 218.

In one embodiment, the loan insurance provider 540 includes an underwriting insurance provider 540b for underwriting the borrower 510 for the loan guarantee insurance 542 and a fronting insurance provider 540a for issuing the loan guarantee insurance 542. The fronting insurance provider 540a issues the loan guarantee insurance 542 in exchange for a promise to repay 544 and a for a fee from the underwriting insurance provider 540b. The fronting insurance provider 540a has a higher credit rating than the underwriting insurance provider 540b. The fronting insurance provider 540a receives the premium 514 from the borrower 510 and the underwriting insurance provider 540b receives the difference 564 between the premium 514 and the fee to the insurance provider 540b. In the event of default on the loan, the loan guarantee insurance provider 540 pays out the insured amount.

In one embodiment, the promise to repay 544 includes one or more of personal equity and a letter of credit, equal to all or a portion of the loan guarantee insurance outstanding. In the event of default on the loan, the fronting insurance provider 540a pays out the insured amount to the lender 520, as shown at 548, and the underwriting insurance provider 540b reimburses the fronting insurance provider 540a, as shown at 546. The insured amount replaces some of the personal guarantee amount that, when combined with a supplemental amount provided by the borrower 510, is sufficient to satisfy the personal guarantee amount and can also confer an investment grade rating for the loan 522. The supplemental amount includes personal equity of the borrower 510, and the loan 522 can be a real estate loan.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A loan guarantee insurance system in a commercial loan arrangement between a borrower and a lender, the loan guarantee insurance system comprising:
   a computer having a processor; and
   a non-transitory computer-readable medium having stored thereon computer-readable instructions, which, when executed by the processor, configured the computer to perform functions that include:

receiving, from a lender, information relating to a borrower request for a loan to complete a commercial real estate project, the information includes (i) an amount of personal guarantee from the borrower, which is reduced from a minimum amount required by the lender, and (ii) a capped insured amount from the lender, which is an amount of loan to be insured less than an entire amount of the loan, the capped insured amount together with the amount of personal guarantee from the borrower meets the required minimum amount;

obtaining information relating to the commercial real estate project from which those risks associated with the development of the commercial real estate project is determined;

calculating terms for issuing the insurance while taking into consideration the determined risks associated with the development of the commercial real estate project, the terms including an insurance premium to be paid by the lender or by the borrower; and directing, to the lender, the issued insurance product, which incorporates the calculated terms and insures the lender up to the capped insured amount such that any loss in project value beyond the capped insured amount is bore by the lender, to permit the lender to release the loan despite the reduced personal guarantee from the borrower.

2. A computer-implemented method for issuing an insurance product in a commercial loan arrangement between a borrower and a lender in which the lender is providing a loan to the borrower and the borrower is required to provide a personal guarantee of a portion of the amount of the loan, the method comprising the steps of:

electronically receiving, from a lender, data containing:
information relating to a borrower request for a loan to complete a commercial real estate project, the information includes:
(i) an amount of personal guarantee from the borrower, which is reduced from a minimum amount required by the lender, and
(ii) a capped insured amount from the lender, which is an amount of loan to be insured less than an entire amount of the loan, the capped insured amount together with the amount of personal guarantee from the borrower meets the required minimum amount;

obtaining information relating to the commercial real estate project from which those risks associated with the development of the commercial real estate project is determined;

calculating terms for issuing the insurance while taking into consideration the determined risks associated with the development of the commercial real estate project, the terms including an insurance premium to be paid by the lender or by the borrower;

directing, to the lender, the issued insurance product, which incorporates the calculated terms and insures the lender up to the capped insured amount such that any loss in project value beyond the capped insured amount is bore by the lender, to permit the lender to release the loan despite the reduced personal guarantee.

3. The method of claim 2, wherein the underwriting criteria comprises one or more of past experience of the borrower, financial statements of the borrower, and personal equity of the borrower.

4. The method of claim 2, wherein the amount insured by the loan guarantee insurance product replaces all of the personal guarantee amount required by the lender.

5. The method of claim 2, wherein the amount insured by the loan guarantee insurance product replaces a portion of the personal guarantee amount required by the lender.

6. A computer-implemented method for providing a loan, in a commercial loan arrangement between a borrower and a lender in which the lender is providing a loan to the borrower and the borrower is required to meet a minimum amount of personal guarantee, the method comprising the steps of:

electronically receiving data containing:
information relating to a borrower request for a loan to complete a commercial real estate project, the information includes:
(i) an amount of personal guarantee from the borrower, which is reduced from a minimum amount required by the lender, and
(ii) a capped insured amount from the lender, which is an amount of loan to be insured less than an entire amount of the loan, the capped insured amount together with the amount of personal guarantee from the borrower meets the required minimum amount;

obtaining information relating to the commercial real estate project from which those risks associated with the development of the commercial real estate project is determined;

calculating terms for requesting an insurance product while taking into consideration the determined risks associated with the development of the commercial real estate project, the terms including an insurance premium to be paid by the lender or by the borrower;

requesting, from an insurance provider, the insurance product, which incorporates the calculated terms and insures the lender up to the capped insured amount such that any loss in project value beyond the capped insured amount is bore by the lender; and releasing the loan to the borrower upon receipt the insurance product despite the reduced personal guarantee;

wherein the steps of the method are performed by a computer according to computer-readable instructions stored on a non-transitory, computer readable medium and executed by a processor.

7. The method of claim 6, wherein the information about the borrower and loan guarantee insurance provider comprises one or more of credit rating information and personal equity information.

8. The method of claim 6, wherein the step of determining the amount to lend to the borrower and the personal guarantee amount further comprises the step of determining a percentage of borrower equity to insured amount.

9. The method of claim 6, wherein the step of determining the loan amount to lend to the borrower and the personal guarantee amount further comprises the step of determining a minimum amount of borrower equity.

10. The method of claim 6, wherein the personal guarantee amount required for the loan varies based on underwriting criteria that includes the amount of borrower equity.

11. A system for providing a loan, the system comprising:
a borrower computer associated with the borrower;
a lender computer associated with the lender; and
a LGIP computer system associated with the LGIP,
wherein LGIP computer system is electronically connected to at least one of the borrower computer and lender computer and is operative to communicate electronic data there between, and
wherein under a commercial loan arrangement between the borrower and the lender, the borrower is required to meet a minimum amount of personal guarantee, wherein the loan guarantee insurance provider provides loan guarantee insurance of an insured amount that reduces some or all of the personal guarantee provided by the borrower, in exchange for a premium from the borrower or the lender, and wherein the lender provides the loan to the borrower after receipt of the loan guarantee insurance, the amount of which together with the amount of personal guarantee provided by the borrower meets the minimum amount, and wherein the LGIP computer system comprises:

an underwriting insurance provider having an associated computer for underwriting the borrower and project for the loan guarantee insurance product; and a fronting insurance provider having an associated computer for issuing the loan guarantee insurance product in exchange for a promise to repay and a fee from the underwriting insurance provider, wherein the fronting insurance provider has a higher credit rating than the underwriting insurance provider, wherein the loan guarantee insurance product includes a policy for at least one of a guarantee and a surety for the insured amount, issued by the LGIP, and wherein the functions performed by the LGIP computer system are performed according to stored, computer-readable instructions executed by one or more processors, the functions performed by the LGIP computer system includes:

receiving, from a lender, information relating to a borrower request for a loan to complete a commercial real estate project, the information includes (i) an amount of personal guarantee from the borrower, which is reduced from a minimum amount required by the lender, and (ii) a capped insured amount from the lender, which is amount of loan to be insured less than an entire amount of the loan, the capped insured amount together with the amount of personal guarantee from the borrower meets the required minimum amount;

obtaining information relating to the commercial real estate project from which those risks associated with the development of the commercial real estate project is determined;

calculating terms for issuing the insurance while taking into consideration the determined risks associated with the development of the commercial real estate project, the terms including an insurance premium to be paid by the lender or by the borrower;

directing, to the lender, the issued insurance product, which incorporates the calculated terms and insures the lender up to the capped insured amount such that any loss in project value beyond the capped insured amount is bore by the lender, to permit the lender to release the loan despite the reduced personal guarantee.

12. The system of claim 11, wherein the loan guarantee insurance replaces or supplements some of the personal guarantee amount and the remainder of the personal guarantee amount is borrower equity.

13. The system of claim 11, wherein in the event of default on the loan, the loan guarantee insurance provider pays out the insured amount.

14. The system of claim 11, wherein the fronting insurance provider receives the premium from the borrower and the underwriting insurance provider receives the difference between the premium and fee to the fronting insurance provider.

15. The system of claim 11, wherein the promise to repay comprises one or more of personal equity and a letter of credit.

16. The system of claim 11, wherein in the event of default on the loan, the fronting insurance provider pays out the insured amount to the lender and the underwriting insurance provider reimburses the fronting insurance provider.

17. The system of claim 11, wherein the insured amount replaces or supplements some or all of the personal guarantee amount that, when combined with a supplemental equity amount provided by the borrower, is sufficient to satisfy the personal guarantee amount.

18. The system of claim 17, wherein the insured amount replaces some or all of the personal guarantee amount that, when combined with the supplemental equity amount provided by the borrower, improves the eligibility for some or all of the loan to achieve an investment grade rating.

19. The system of claim 17, wherein the supplemental amount comprises personal equity of the borrower.

\* \* \* \* \*